US008348657B2

(12) United States Patent
Mai et al.

(10) Patent No.: US 8,348,657 B2
(45) Date of Patent: Jan. 8, 2013

(54) TONNAGE REGULATING STRUCTURE AND A MOLD INCORPORATING SAME

(75) Inventors: Arnold Mai, Irrel (DE); Jean-Christophe Witz, Yutz (FR); Laurent Christel Sigler, Hettange-Grande (FR); David Dubuis, Evrange (FR); Sven Kmoch, Platten (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/123,160

(22) PCT Filed: Oct. 9, 2009

(86) PCT No.: PCT/CA2009/001402
§ 371 (c)(1),
(2), (4) Date: Apr. 7, 2011

(87) PCT Pub. No.: WO2010/051620
PCT Pub. Date: May 14, 2010

(65) Prior Publication Data
US 2011/0212215 A1    Sep. 1, 2011

Related U.S. Application Data

(60) Provisional application No. 61/111,865, filed on Nov. 6, 2008.

(51) Int. Cl.
*B29C 45/64* (2006.01)

(52) U.S. Cl. .............. 425/190; 425/451.9; 425/472; 425/595

(58) Field of Classification Search ............ 425/190, 425/450.1, 451.9, 472, 589, 595
See application file for complete search history.

(56) References Cited

U.S. PATENT DOCUMENTS

| 5,015,426 A | 5/1991 | Maus et al. |
| 5,326,244 A | 7/1994 | Ridgill et al. |
| 5,736,173 A | 4/1998 | Wright et al. |
| 7,597,551 B2 * | 10/2009 | Mai et al. ............ 425/190 |
| 2004/0217502 A1 | 11/2004 | Klotz |
| 2007/0184148 A1 | 8/2007 | Toyooka et al. |
| 2007/0212443 A1 | 9/2007 | Li et al. |
| 2007/0292558 A1 | 12/2007 | Irwine et al. |
| 2009/0022845 A1 | 1/2009 | Mai et al. |

FOREIGN PATENT DOCUMENTS

| EP | 1764533 A2 | 3/2007 |
| JP | 60097815 A | 5/1985 |
| JP | 63296914 A | 12/1988 |
| JP | 8085135 A | 4/1996 |
| WO | 2007101351 A1 | 9/2007 |

OTHER PUBLICATIONS

PCT International Search Report, Nov. 6, 2009, Zoran Novakovic, 4 pages.

* cited by examiner

*Primary Examiner* — James Mackey
(74) *Attorney, Agent, or Firm* — Husky Intellectual Property Services

(57) ABSTRACT

Embodiments of the present invention are directed to a tonnage regulating structure and a mold incorporating same. For example, a tonnage regulating structure (302, 1002, 1202) for use in a mold (502) of a molding machine, the mold (502) being associated with an opening clearance (520) between mold faces in a mold closed and clamped configuration, is provided. The tonnage regulating structure (302) comprises a body (304, 1040, 1240) having a first height (306) in a resting configuration, the first height (306) selected to be larger than the opening clearance (520) between the mold faces in a mold closed and clamped configuration; the body (304, 1040, 1240) including a compensating structure (308), the compensating structure (308) for regulating, in use under applied clamp tonnage, the body (304, 1040, 1240) to a second height (320), the second height (320) being smaller than the first height (306).

5 Claims, 15 Drawing Sheets

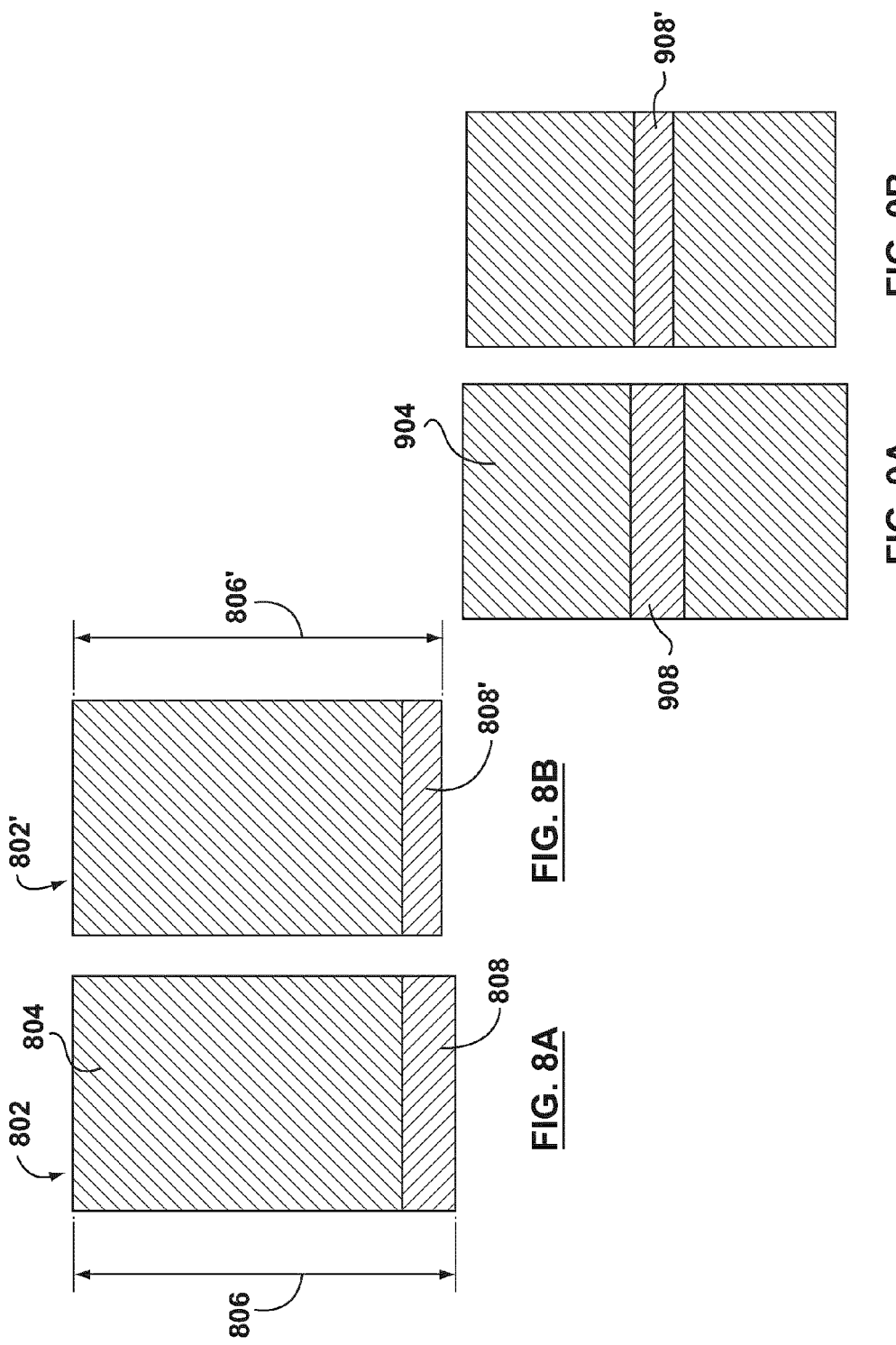

TONNAGE REGULATING STRUCTURE AND A MOLD INCORPORATING SAME

FIELD OF THE INVENTION

The present invention generally relates to, but is not limited to, a molding system, and more specifically the present invention relates to, but is not limited to, a tonnage regulating structure and a mold incorporating same.

BACKGROUND OF THE INVENTION

Molding is a process by virtue of which a molded article can be formed from molding material by using a molding system. Various molded articles can be formed by using the molding process, such as an injection molding process. One example of the molded article that can be formed, for example, from polyethylene terephthalate (PET) material is a preform that is capable of being subsequently blow-molded into a beverage container, such as, a bottle and the like. Other examples of the molded articles include thin-wall containers (i.e. yogurt containers, cups, etc), medical appliances and the like.

In the early days of injection molding, a single-cavity mold for producing a single molded article per molding cycle was typically deployed. Within the single-cavity mold, typically, melt would be delivered from a plasticizing unit to a molding cavity, defined within the single-cavity mold, via a sprue. With developments in the injection molding art, multi-cavity molds have been introduced with an outlook to increase the number of molded articles manufactured per molding cycle. Typically, within the multi-cavity mold, the melt is delivered from the plasticizing unit to each of a plurality of molding cavities of the multi-cavity mold through a melt distribution network, also known to those of skill in the art, as a "hot runner".

With ongoing market pressures on the converters (i.e. entities that convert raw material, such as resin, into a molded article, such as a preform, for example) to keep the output per capita and the operating costs under control (and, even better, to improve the output per capita ratio and decrease the costs), molding machine suppliers (such as, for example, Husky Injection Molding, Ltd of Bolton, Ontario, www.husky.ca) have progressively increased mold cavitation, effectively, increasing the number of molded articles that can be produced in a given molding cycle.

With further increases in cavitation, a term "tight pitch" has become widely used. The term denotes a mold having a relatively tight pitch between cavities. For example, Husky Injection Molding Systems, Ltd sells such molds under a trademark MICROPITCH. One problem that has been realized in the industry, which is particularly acute in the tight pitch molds, is irregular distribution of forces amongst various components of the mold in the mold clamped configuration. This is particularly exacerbated by the fact that even though mold stack components are produced to very tight tolerances, there are nevertheless minute differences in dimensions (such as for example, height thereof) that may significantly exacerbate the problem. This problem can be further exacerbated by lack of proper platen parallelism, platen deflection in use and the like.

Consider a given mold having 144 cavities and, accordingly, 144 mold stacks (including a molding cavity insert, a core insert, a neck ring pair and other associated molding components). A first given one of the 144 mold stacks may be slightly higher than a second given one of the 144 mold stacks. In this scenario, when full clamp force is exerted onto the mold, the first given one of the 144 mold stacks will experience deformation. This, in turn, can lead to premature wear, molding defects evident on molded articles and the like.

By adding more cavities into a mold, the available shut-off area is limited and usually falls below a given standard. This, in turn, requires adding shut-off area with external features. One solution pursued in the industry has been introduction of so-called "tonnage blocks", which are primarily (but not exclusively) used on tight pitch molds. Generally speaking, the reason to add tonnage blocks to a mold is to increase the surface area in contact under clamp in order to prevent permanent deformation of the shut-off faces (also known as hobbing). The tonnage block generally comprises a structure inserted in-between complementary mold halves and is generally configured to absorb or re-distribute at least a portion of the clamp force.

US patent application 2007/0212443 published to Guoming, et al. on Sep. 13, 2007 discloses an injection mold including a connecting structure for separating confronting faces of a slide member and a mold base, respectively, during a movement of the slide member. In accordance with several embodiments of the invention, the connecting structure may include a compressible member such that the slide member is biased away from the mold base, and wherein a positive contact between the confronting surfaces is configurable in response to an applied clamping force between the slide member and the mold base. In accordance with an alternative embodiment of the invention a cam arrangement links the slide member and the mold base enabling a positive contact between the confronting surfaces when the slide member is arranged in the in-mold position, and providing a gap between the confronting surfaces during at least a portion of an interval when the slide member is moving. The patent application teaches inter alia a clamping force block 29, which is added (if necessary) to absorb clamping force A (FIG. 1), which goes through the mold stack when such clamping force is too high.

US patent application 2007/0292558 published to Irwine et al. on Dec. 20, 2007 discloses a hot-runner assembly for injection molding equipment. The hot-runner assembly includes a front plate and a backing plate spaced from one another so as to define an inter-plate volume. The inter-plate volume contains one or more manifolds for conducting flowable material to a plurality of injection nozzles. The inter-plate volume also contains inter-plate support distributed between a first inter-plate support zone located immediately adjacent the manifold(s) and a second inter-plate support zone that makes up the balance of the inter-plate volume so that the first inter-plate support zone has a inter-plate support footprint density that is greater than the inter-plate support footprint density in the second inter-plate support zone. This patent application teaches inter alia an inter-plate support 120.

US patent application 2007/0184148 published to Naoto, et al. on Aug. 9, 2007 discloses a mold for in-mold decorating simultaneously with molding manufacturable at low cost in a short delivery period in manufacturing the mold and capable of stably mass-producing molded article in molding the molded articles, wherein cavity forming blocks having molding cavities into which an in-mold decoration film is to be inserted are mounted on diesets on a fixed side and a movable side. Pockets into which the cavity forming blocks are fitted are not formed in the diesets, the diesets and cavity forming blocks are positioned by engaging projections formed on one of the contact faces thereof and engaging recesses formed in the other before installation, and a plurality of mold clamping force receiving parts are installed on the outside of a film passing area around the cavity forming blocks. This patent application teaches inter alia a plurality of clamping force-receiving portions 6a, 6b that are set partly around the cavity-forming blocks.

SUMMARY OF THE INVENTION

According to a first broad aspect of the present invention, there if provided a tonnage regulating structure for use in a mold of a molding machine, the mold being associated with an opening clearance between mold faces in a mold closed and clamped configuration, is provided. The tonnage regulating structure comprises a body having a first height in a resting configuration, the first height selected to be larger than the opening clearance between the mold faces in a mold closed and clamped configuration; the body including a compensating structure, the compensating structure for regulating, in use under applied clamp tonnage, the body to a second height, the second height being smaller than the first height.

According to a second broad aspect of the present invention, there is provided a mold for use in a molding machine. The mold comprises a cavity portion including a cavity side mold face) and a core portion including a core side mold face, the cavity portion and the core portion defining therebetween a molding cavity; the mold being associated with an opening clearance between the cavity side mold face and the core side mold face in a mold closed and clamped configuration, a tonnage regulating structure including: a body having a first height in a resting configuration, the first height selected to be larger than the opening clearance; the body including a compensating structure, the compensating structure for regulating, in use under applied clamp tonnage, the body to a second height, the second height being smaller than the first height.

According to a third broad aspect of the present invention, there is provided a tonnage regulating structure for regulating tonnage force distribution in a mold. The tonnage regulating structure comprises a body selectively actuatable between a resting height and an in-use height; the body including a compensating structure, the compensating structure being operable to allow the body to controllably selectively toggle between the resting height and the in-use height.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 8A and FIG. 8B depict an alternative non-limiting implementation for a compensating structure of the tonnage regulating structure.

FIG. 9A and FIG. 9B depict yet another alternative non-limiting implementation for a compensating structure of the tonnage regulating structure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Inventors have developed embodiments of the present invention based, at least partially, on a realization that there exists at least one problem associated with prior art tonnage regulating structures. This problem will now be illustrated for the benefit of the reader with reference to FIG. 1A and FIG. 1B, as well as FIG. 2A and FIG. 2B. It should be expressly noted that illustrations in FIG. 1A, FIG. 1B, FIG. 2A and FIG. 2B are schematic for the purposes of illustration of prior-art problems only, but it is expected that those of ordinary skill in the art will appreciate actual implementations of the components to be described herein below.

Figure 1A:
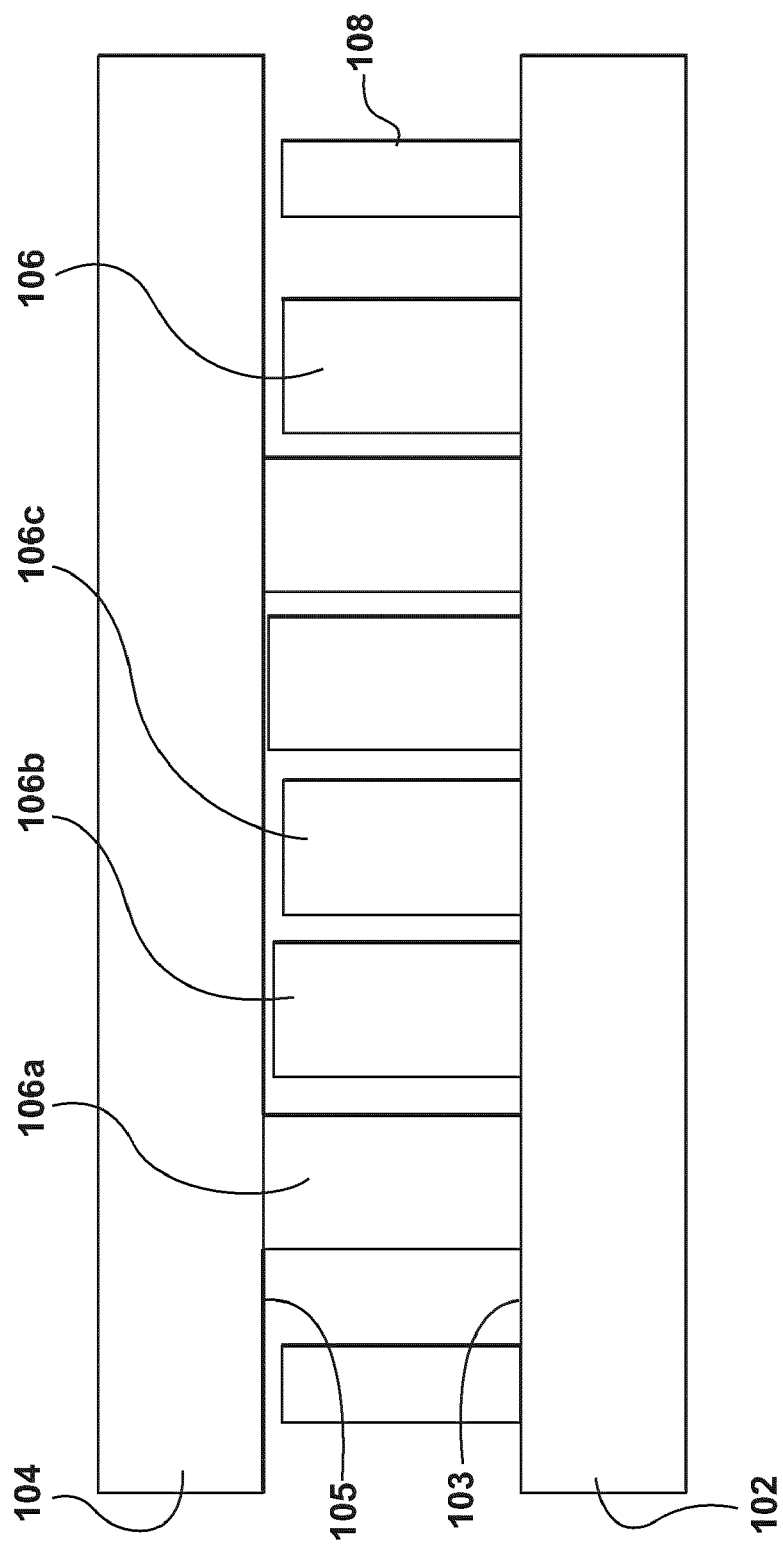
FIG. 1A and FIG. 1B depict a schematic representation of a mold incorporating a tonnage regulating structure implemented according to known techniques, the tonnage regulating structure being shorter than it should be.
Figure 1B:
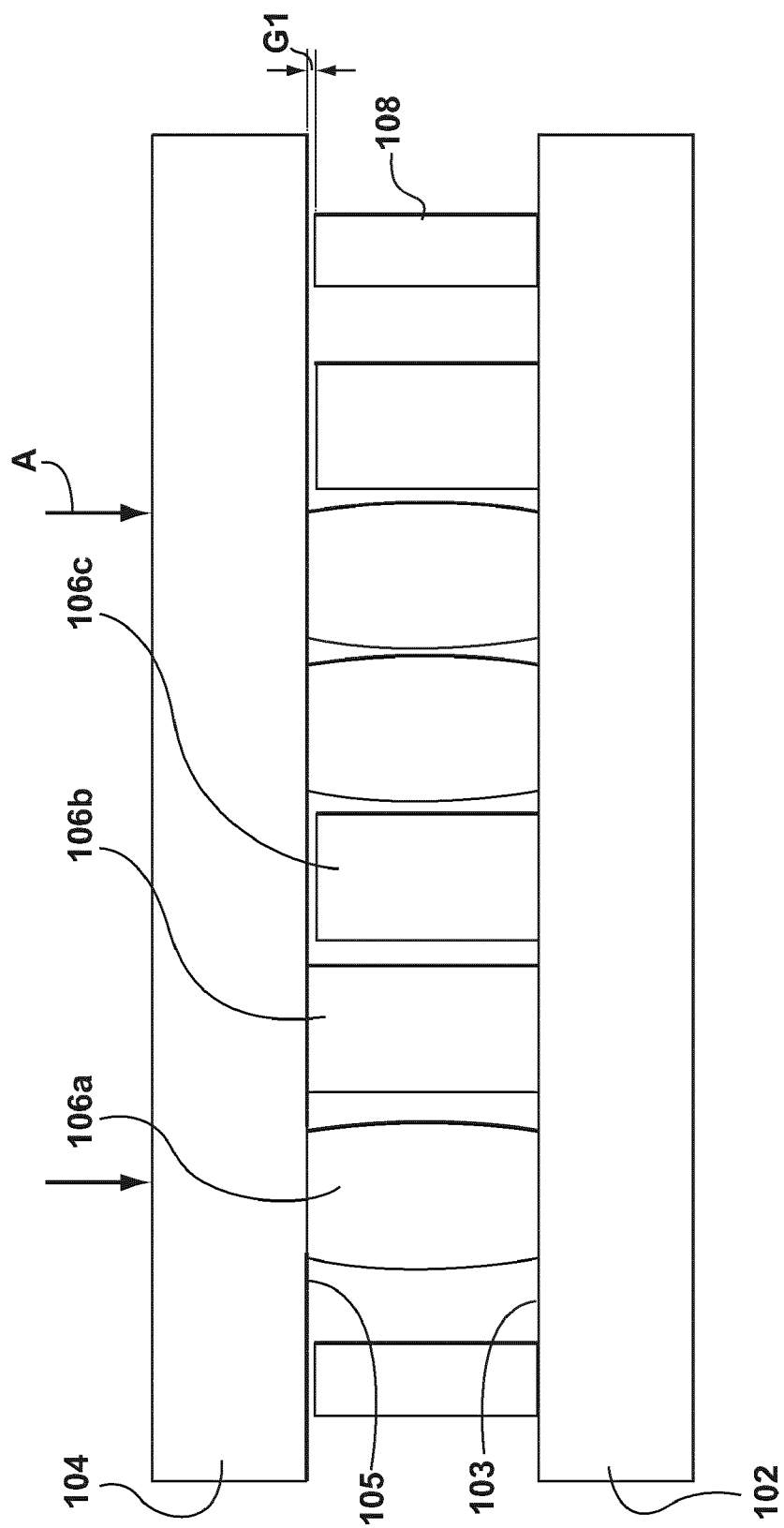

FIG. 1A and FIG. 1B show a scenario where a tonnage regulating structure is shorter than it should be. More specifically, FIG. 1A schematically depicts a first mold half 102 and a second mold half 104 and disposed therebetween a plurality of molding stacks 106. The first mold half 102 is associated with a first mold face 103 and the second mold half 104 is associated with a second mold face 105.

It is evident from FIG. 1A that some of the plurality of molding stacks 106 are dimensioned (length-wise) differently from others of the plurality of molding stacks 106, these differences in dimensions being greatly exaggerated, for illustration purposes only, in FIG. 1A. For example, a first molding stack 106a is longer than a second molding stack 106b. By the same token, the second molding stack 106b is longer than a third molding stack 106c. FIG. 1A further depicts two instances of a tonnage regulating structure 108 disposed between the first mold half 102 and the second mold half 104, the two instances of the tonnage regulating structure 108 being implemented according to known techniques. In this scenario, it happens that despite very strict production tolerances, the tonnage regulating structure 108 is dimensioned somewhat shorter than the first molding stack 106a and somewhat longer than the third molding stack 106c, again these differences being greatly exaggerated in FIG. 1A for the purpose of illustration.

FIG. 1B illustrates the net result of these differences in length when at least a portion of clamp tonnage "A" is applied (in a manner known in the art, the clamp tonnage "A" can be generated by a suitable hydraulic clamp, electric clamp, toggle clamp or the like). Within the illustration, it can be clearly seen that the first molding stack 106a is deformed under the applied clamp tonnage "A". Furthermore, it is clear that there exists a gap "G1" between the tonnage regulating structure 108 and the second mold face 105. In other words, the two instances of the tonnage regulating structure 108 fail to perform their function of absorbing a portion of the load and, at the same time, the first molding stack 106a and, eventually, the second molding stack 106b (when the full clamp force "A" is exerted) will get deformed, which will lead over time to premature wear, etc.

By the same token, a problem can occur when a tonnage regulating structure is longer than it should be. This will now be demonstrated with reference to FIG. 2A and FIG. 2B.

Figure 2A:
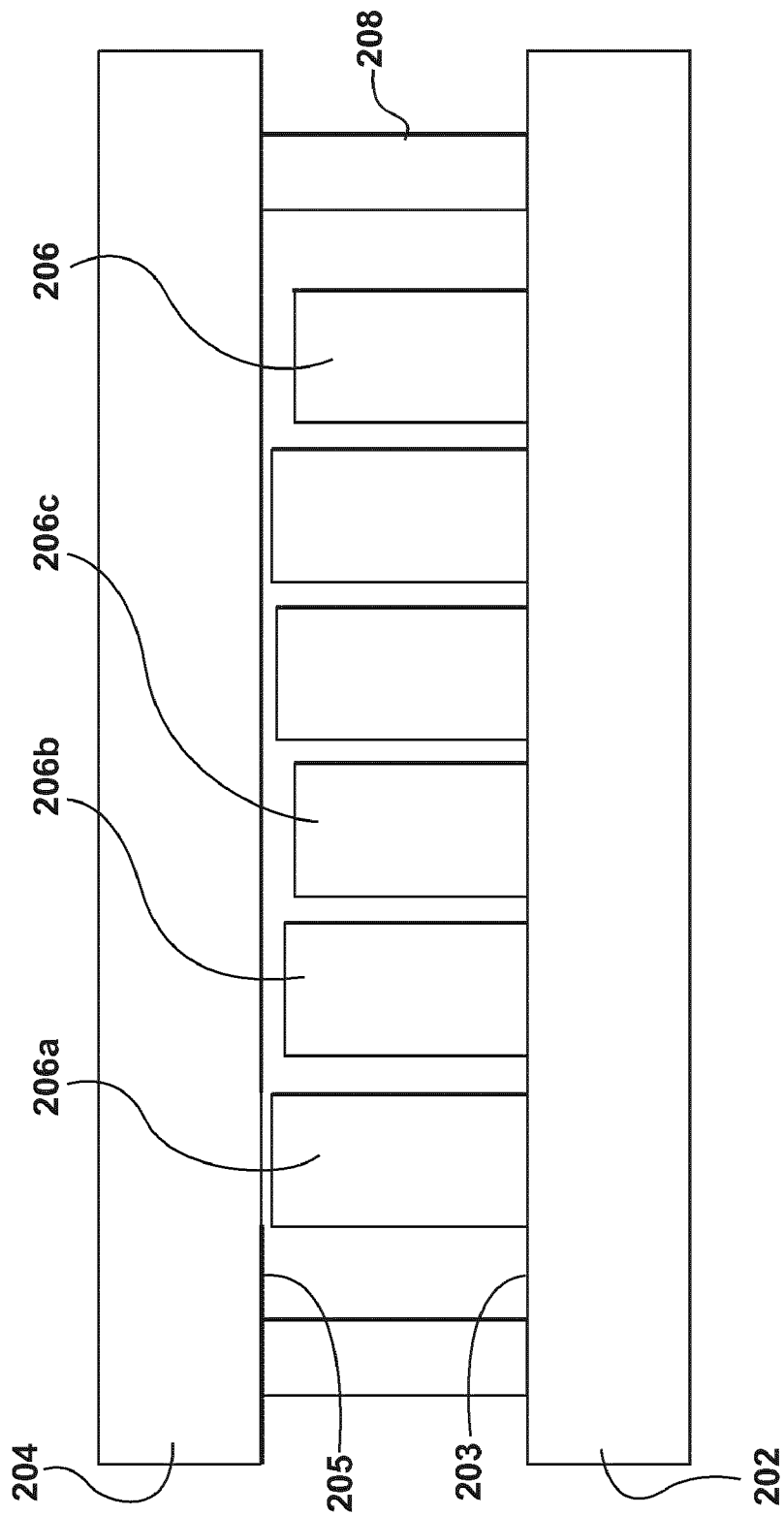
FIG. 2A and FIG. 2B depict a schematic representation of a mold incorporating a tonnage regulating structure implemented according to known techniques, the tonnage regulating structure being longer than it should be.

More specifically, FIG. 2A schematically depicts a first mold half 202 and a second mold half 204 and disposed therebetween a plurality of molding stacks 206. The first mold half 202 is associated with a first mold face 203 and the second mold half 204 is associated with a second mold face 205.

It is evident from FIG. 2A that some of the plurality of molding stacks 206 are dimensioned (length-wise) differently from others of the plurality of molding stacks 206, these differences in dimensions being greatly exaggerated, for illustration purposes only, in FIG. 2A. For example, a first molding stack 206a is longer than a second molding stack 206b. By the same token, the second molding stack 206b is longer than a third molding stack 206c. FIG. 2A further depicts two instances of a tonnage regulating structure 208 disposed between the first mold half 202 and the second mold half 204, the two instances of the tonnage regulating structure 208 being implemented according to known techniques. As it happens, despite very strict production tolerances, the tonnage regulating structure 208 is dimensioned somewhat longer than the first molding stack 206a, the second molding stack 106b and the third molding stack 106c, again these differences being greatly exaggerated in FIG. 2A for the purposes of illustration.

Figure 2B:
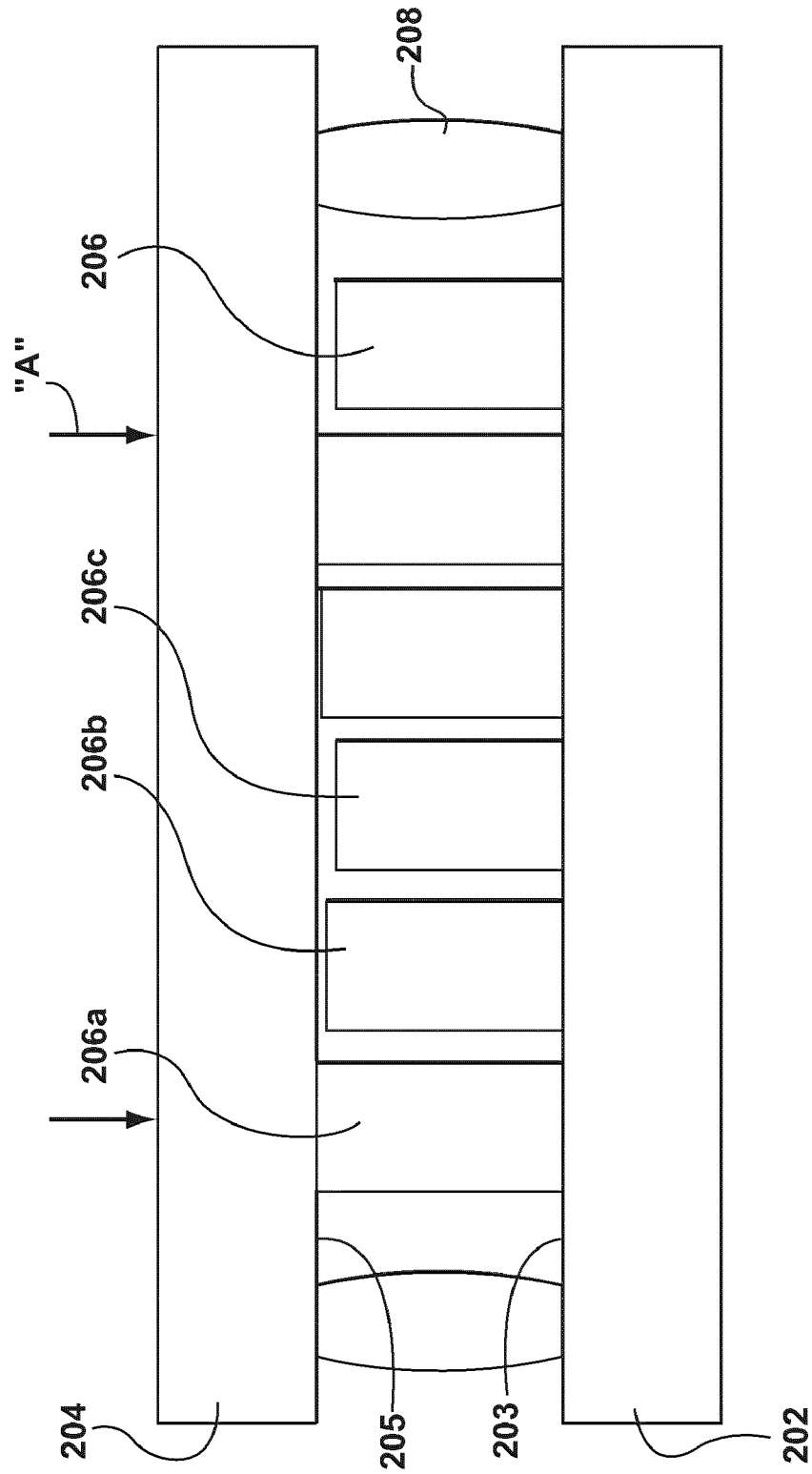

FIG. 2B illustrates the net result of these differences in length when at least a portion of clamp tonnage "A" is applied (in a manner known in the art, the clamp tonnage "A" can be generated by a suitable hydraulic clamp, electric clamp, toggle clamp or the like). Within the illustration, it can be clearly seen that the two instances of the tonnage regulating structure 208 are deformed, even though the second mold face 205 just abuts the first molding stack 206a and is still spaced away from the second molding stack 206b and the third molding stack 206c by respective distances, which are not separately numbered. Assuming that the clamp force "A" depicted in FIG. 2B is only a partial clamp force and upon further application of the clamp force "A", the two instances of the tonnage regulating structure 208 will be further deformed, leading to potential failure to perform their function. It is also noted that in this prior art implementation, deformation and extent of deformation of the tonnage regulating structure 208 is uncontrollable by the operator/user. In other words, the extent of deformation will depend on the relationship between the height of the tonnage regulating structure 208 and the various components of the molding stack 206.

Figure 3:
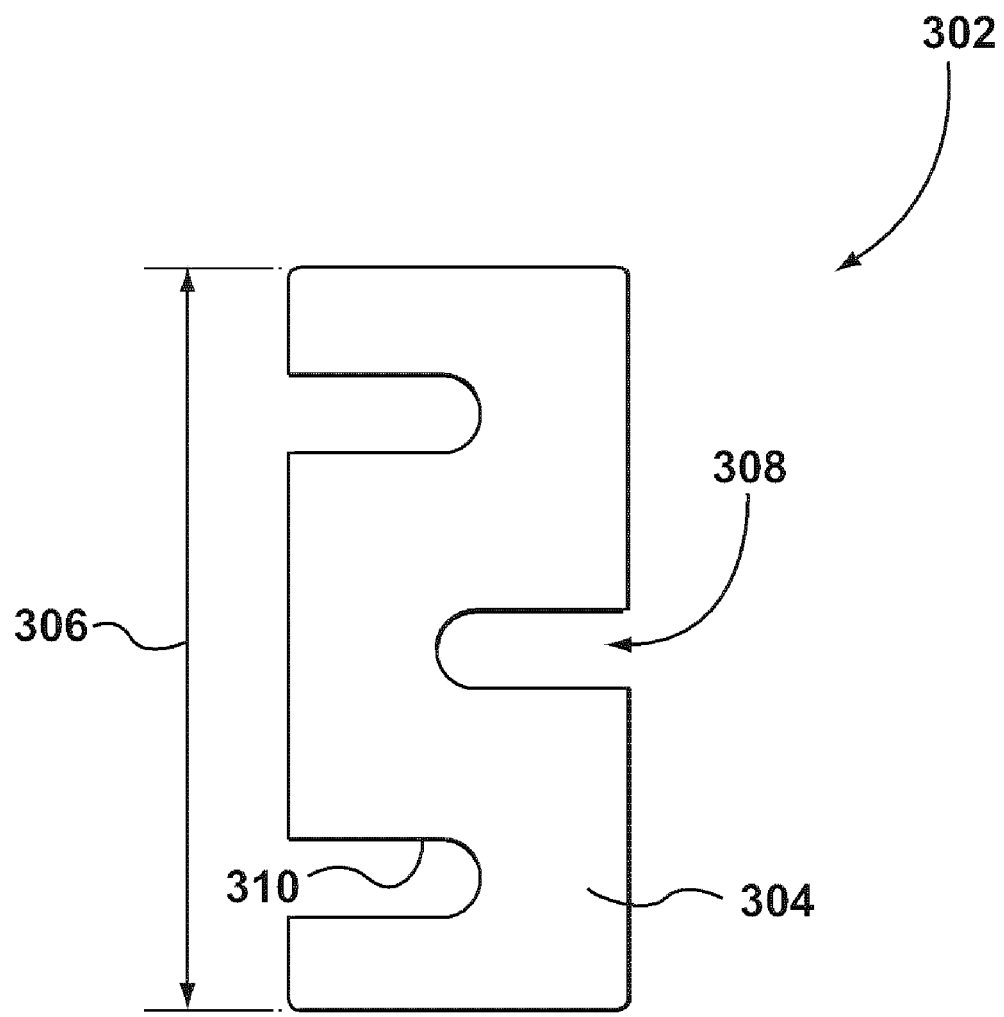
FIG. 3 depicts a front view of a tonnage regulating structure implemented in accordance with a non-limiting embodiment of the present invention, the tonnage regulating structure being depicted in a resting configuration.

With reference to FIG. 3, there is depicted a non-limiting embodiment of a tonnage regulating structure 302 implemented in accordance with a non-limiting embodiment of the present invention. More specifically, FIG. 3 depicted a front view thereof.

The tonnage regulating structure 302 comprises a body 304. The body 304 is associated with a first height 306—the first height 306 being height of the body 304 in a resting configuration or in other words, in a configuration when it is not in use, i.e. not positioned within a mold (not depicted) or positioned in the mold (not depicted) in a mold-open configuration.

The body 304 comprises a compensating structure 308. In the particular embodiment depicted in FIG. 3, the compensating structure 308 comprises a plurality of cut-out portions 310 defined in the body 304. In the specific example being depicted herein, there are three instances of the plurality of cut-out portions 310. It is noted that the plurality of cut-out portions 310 are spaced along the height of the tonnage regulating structure 302.

However, in alternative non-limiting embodiments of the present invention, other number of instances, other location and other form factor can be used. It is noted, however, that those skilled in the art will be able to select the location, form factor, number and depth of the plurality of cut-out portions 310 based on the following considerations. Enough material should be taken out by virtue of the plurality of cut-out portions 310 to enable the compensating effect (to be described herein below) to occur. At the same time, the remaining material of the body 304 should allow for the tonnage regulating structure 302 to perform the function of absorbing and/or re-distributing a portion of the clamp force "A".

Figure 4:
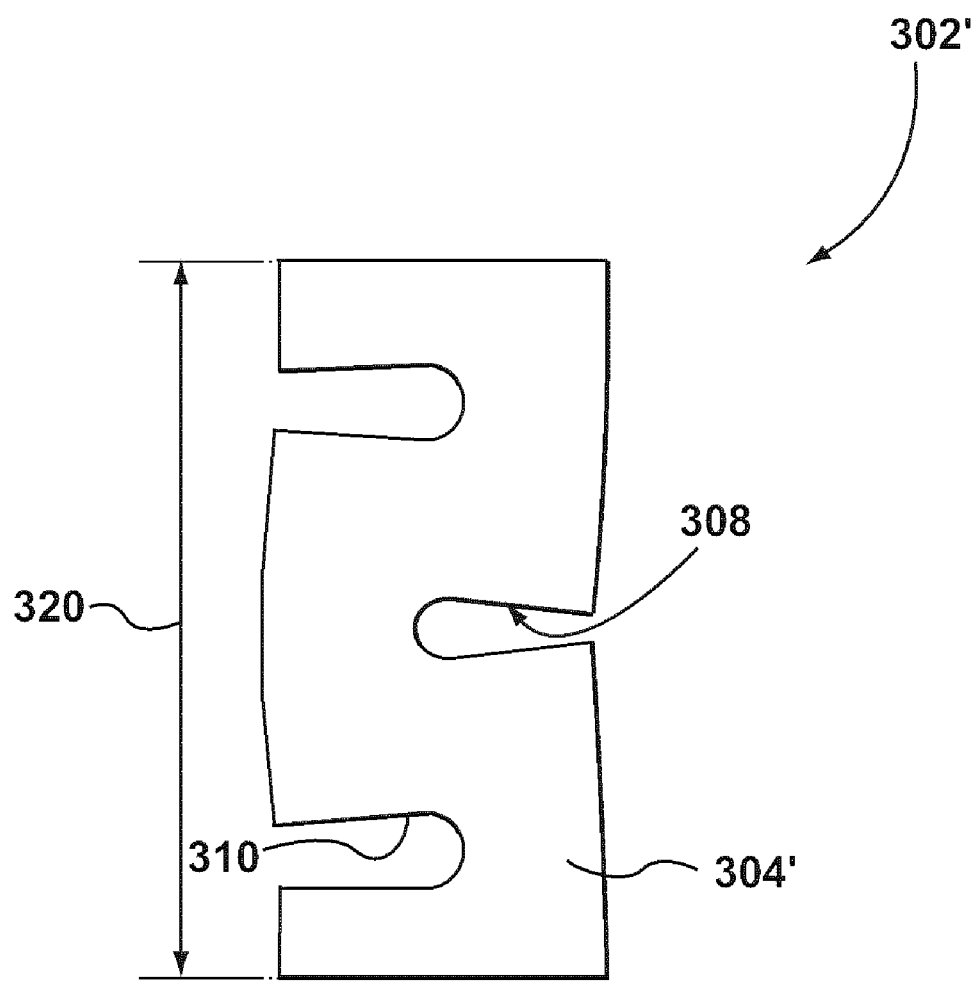
FIG. 4 depicts a front view of the tonnage regulating structure of FIG. 3, in an in-use configuration.

Generally speaking, the purpose of the compensating structure 308 is to control the first height 306 of the body 304 to a second height 320, depicted in FIG. 4, under applied clamp tonnage "A" described herein above. FIG. 4 depicts a tonnage regulating structure 302', which is actually the tonnage regulating structure 302 of FIG. 3 under applied clamp tonnage "A". The tonnage regulating structure 302' similarly has a body 304' and the body 304' is associated with the second height 320. The second height 320 is somewhat shorter than the first height 306. Put another way, the second height 320 is the height of the body 304' in the "in-use" configuration or in other words when it is installed in the mold (not depicted) and the mold is in the mold-clamped configuration. In this particular example, this result is achieved due to the "spring like" or compression effect attributable to the compensating structure 308. In other words, the compensating structure 308 affords a degree of resiliency to the body 304 that allows the body 304 to selectively change:

(a) from the first height 306 to the second height 320 when the mold (not depicted) is being closed and clamped; and
(b) from the second height 320 to the first height 306 when the mold (not depicted) is being opened.

Figure 5:
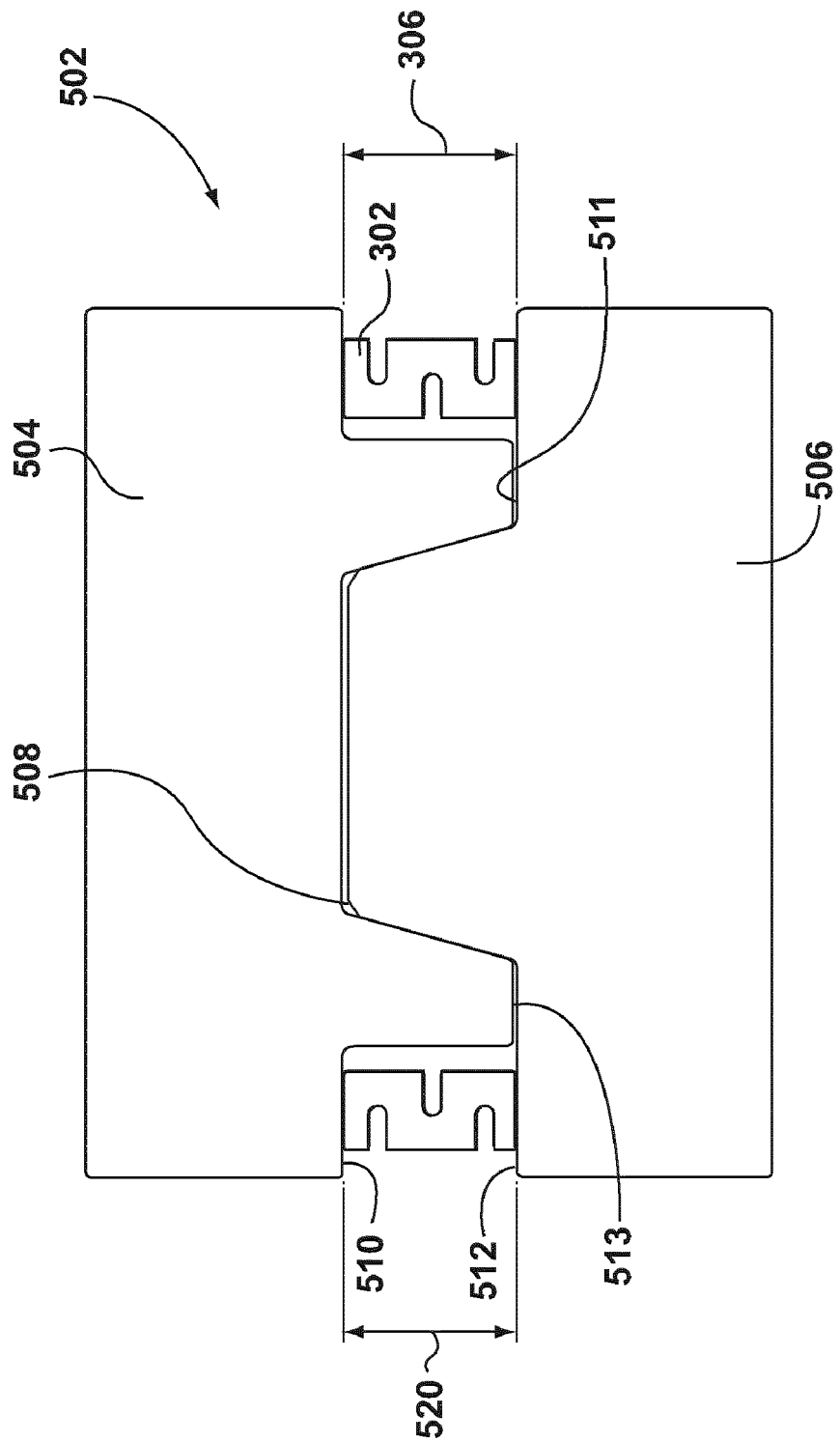
FIG. 5 depicts a schematic representation of a mold incorporating the tonnage regulating structure of FIG. 3.

This will be further illustrated with reference to FIG. 5. FIG. 5 depicts an example of a mold 502 for use in a molding machine (not depicted, but well known to those of skill in the art). The mold 502 comprises a single molding cavity, but this needs not be so in every embodiment of the present invention and, as such, in alternative embodiments a multi-cavity mold may of course be used.

The mold 502 comprises a cavity portion 504 and a core portion 506 defining together therebetween a molding cavity 508. The cavity portion 504 comprises a cavity side mold face 510 and the core portion 506 comprises a core side mold face 512. The cavity side mold face 510 includes a cavity side parting line surface 513 and the core side mold face 512 includes a core side parting line surface 511, these sometimes also being referred to by those of skill in the art as a "shadow face".

Also provided in FIG. 5 are two instances of the tonnage regulating structure 302 implemented in accordance with the embodiment depicted in FIG. 3 and FIG. 4. FIG. 5 depicts a configuration of the mold 502 where the closing of the cavity portion 504 and the core portion 506 has begun, but no clamp tonnage is yet being applied.

Within the illustration, the tonnage regulating structure 302 is associated with the first height 306, as previously described. The mold 502 is associated with an opening clearance 520—that is a distance between the cavity side mold face 510 and the core side mold face 512. The opening clearance 520 is somewhat greater than a clearance between the cavity side mold face 510 and the core side mold face 512 in the mold closed and clamped configuration (not depicted in FIG. 5).

Figure 6:
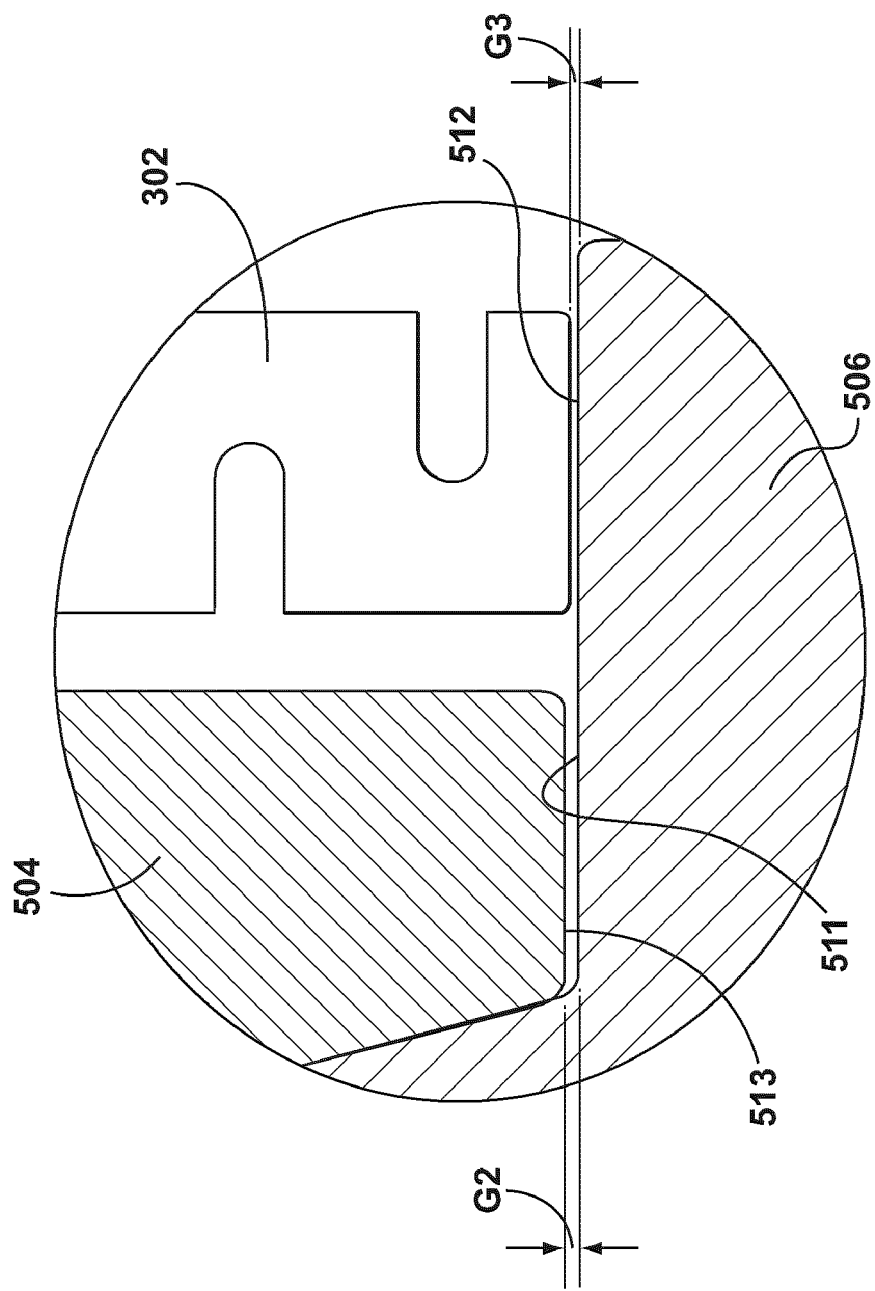
FIG. 6 depicts a portion of the mold of FIG. 5 in greater detail.

Reference will now be made to FIG. 6, which depicts a portion of the mold 502 of FIG. 5 in greater detail. FIG. 6 shows a portion of the core portion 506 and a portion of the cavity portion 504, as well as a portion of the tonnage regulating structure 302. It is useful to recall now that the opening clearance 520 is somewhat greater than a clearance between the cavity side mold face 510 and the core side mold face 512 in the full mold closed and clamped configuration. This means and as is illustrated in FIG. 6, that in the position where the mold 502 is in the configuration where the closing of the cavity portion 504 and the core portion 506 has begun, but no clamp tonnage "A" is yet applied, a second gap "G2", defined between the core side parting line surface 511 and the cavity side parting line surface 513, is greater than a third gap "G3" defined between the tonnage regulating structure 302 and the core side mold face 512.

As the clamp tonnage "A" is applied to the mold 502, the second gap "G2" will eventually diminish to a point where the cavity side mold face 510 abuts the core side mold face 512. At the same time, the compensating structure 308 will cause the tonnage regulating structure 302 to enter configuration depicted at 302' in FIG. 4 (i.e. change from the first height 306 to the second height 320).

To summarize, what the description of FIG. 6 demonstrates is:

(a) the tonnage regulating structure 302 has a resting height (in the "non-use" configuration) which is greater than the clearance between mold faces (ex. the first mold face 103 and second mold face 105) in a mold closed and clamped configuration.

(b) the tonnage regulating structure 302 has an in-use height which is substantially the same as the clearance between mold faces (ex. the first mold face 103 and second mold face 105) in a mold closed and clamped configuration.

Essentially, the compensating structure 308 allows the tonnage regulating structure 302 to toggle between these two configurations (i.e. two heights thereof), effectively compensating for any stack height differences and effectively, at least mitigating some of the problems discussed with reference to the prior art approaches. In other words, the compensating structure 308 allows for the body 304 to be selectively actuatable between the first height 306 in a resting configuration, the first height 306 selected to be larger than the opening clearance 520, and the second height 320 in the in-use configuration, the second height 320 substantially corresponding to a clearance between mold faces (ex. the first mold face 103 and second mold face 105) in a mold closed and clamped configuration.

Figure 13:
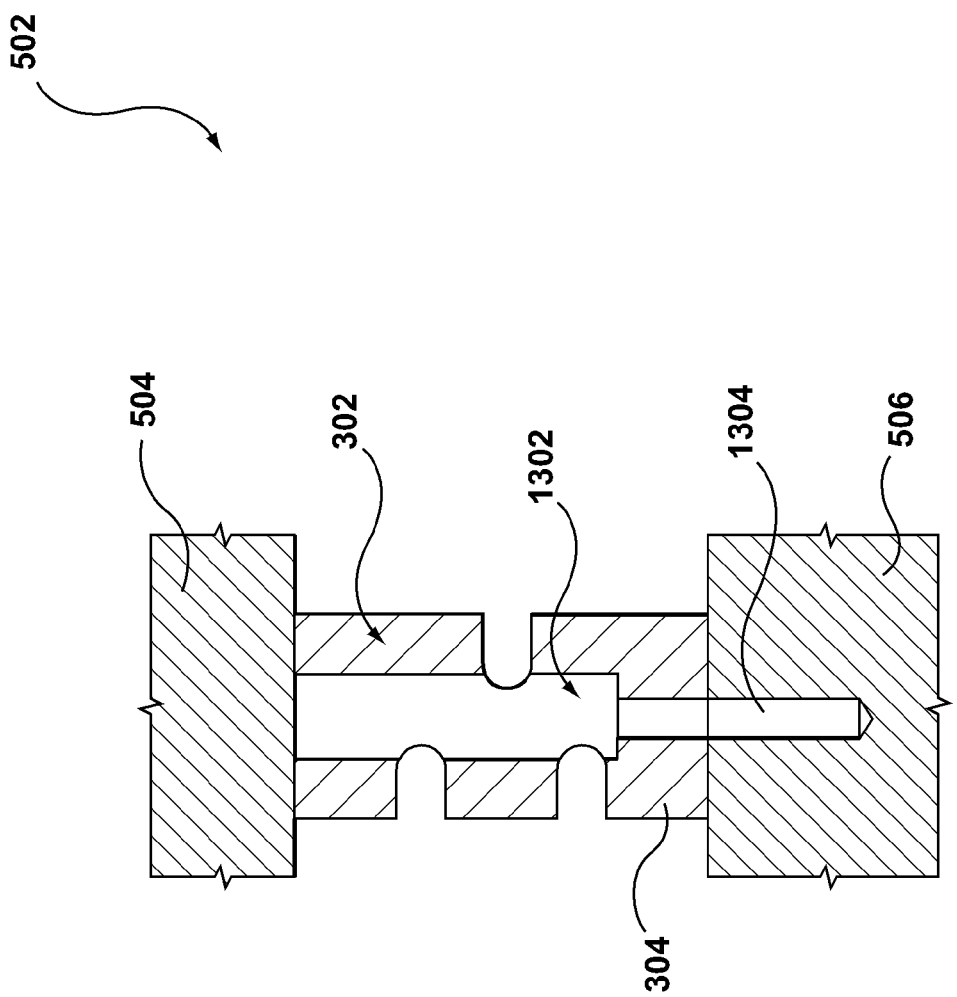
FIG. 13 depicts a cross section of a portion of the mold of FIG. 5.

To complete description of the structure of the tonnage regulating structure 302, a brief reference is made to FIG. 13, which depicts a cross section of a portion of the mold 502 and shows the tonnage regulating structure 302, a portion of the cavity portion 504 and a portion of the core portion 506. The body 304 of the tonnage regulating structure 302 has defined, therethrough, an aperture 1302. The aperture 1302 is configured, in cooperation with a complementary aperture 1304 defined in the core portion 506, to accept a suitable fastener (not depicted) to couple the body 304 to the core portion 506. In an alternative configuration (not depicted), the body 304 can be coupled to the cavity portion 504 and in those embodiments, the complementary aperture 1304 can be defined on the cavity portion 504.

Figure 7A:
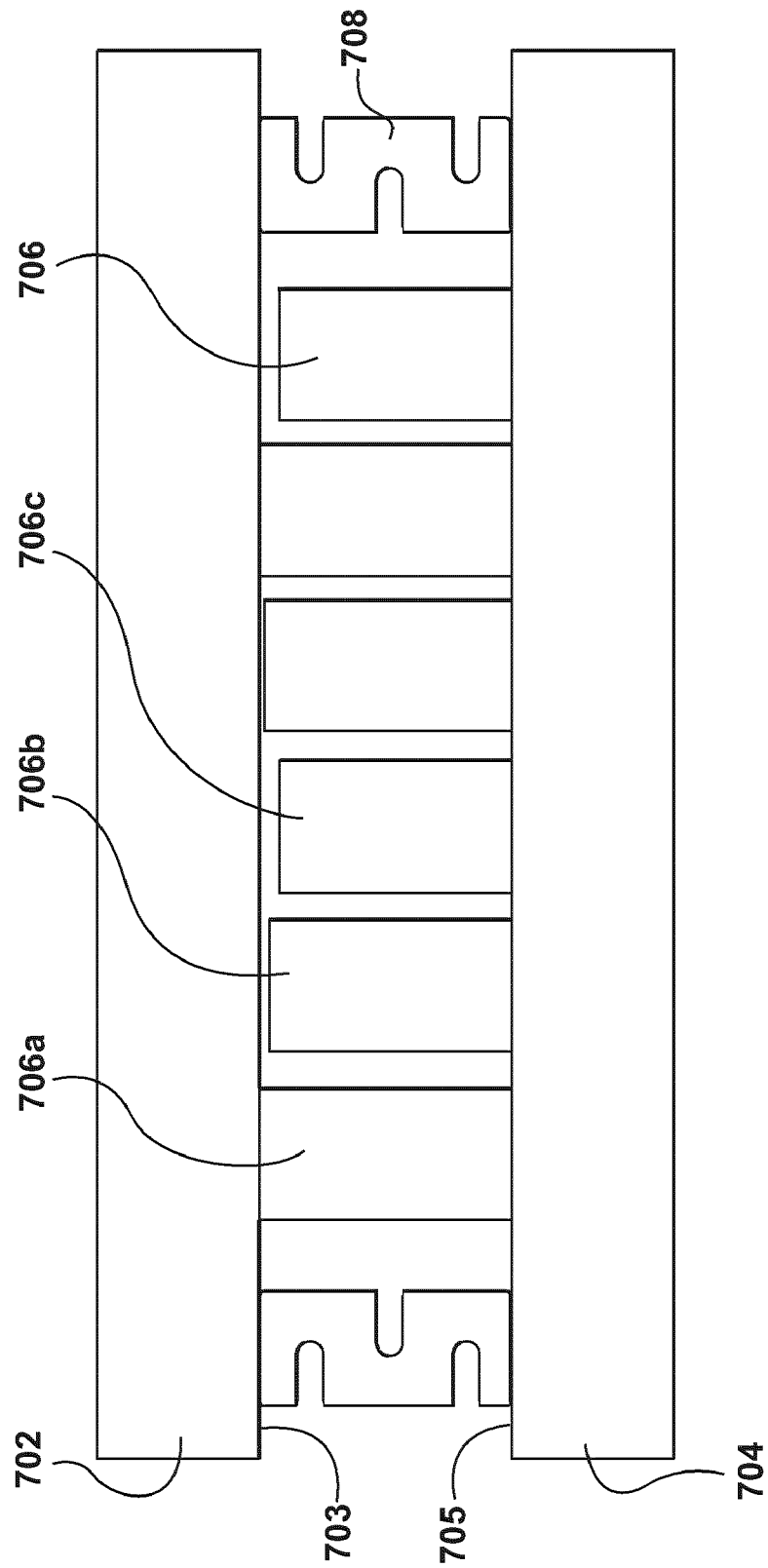
FIG. 7A and FIG. 7B depict a schematic representation of a mold incorporating the tonnage regulating structure of FIG. 3, demonstrating a technical effect thereof.
Figure 7B:
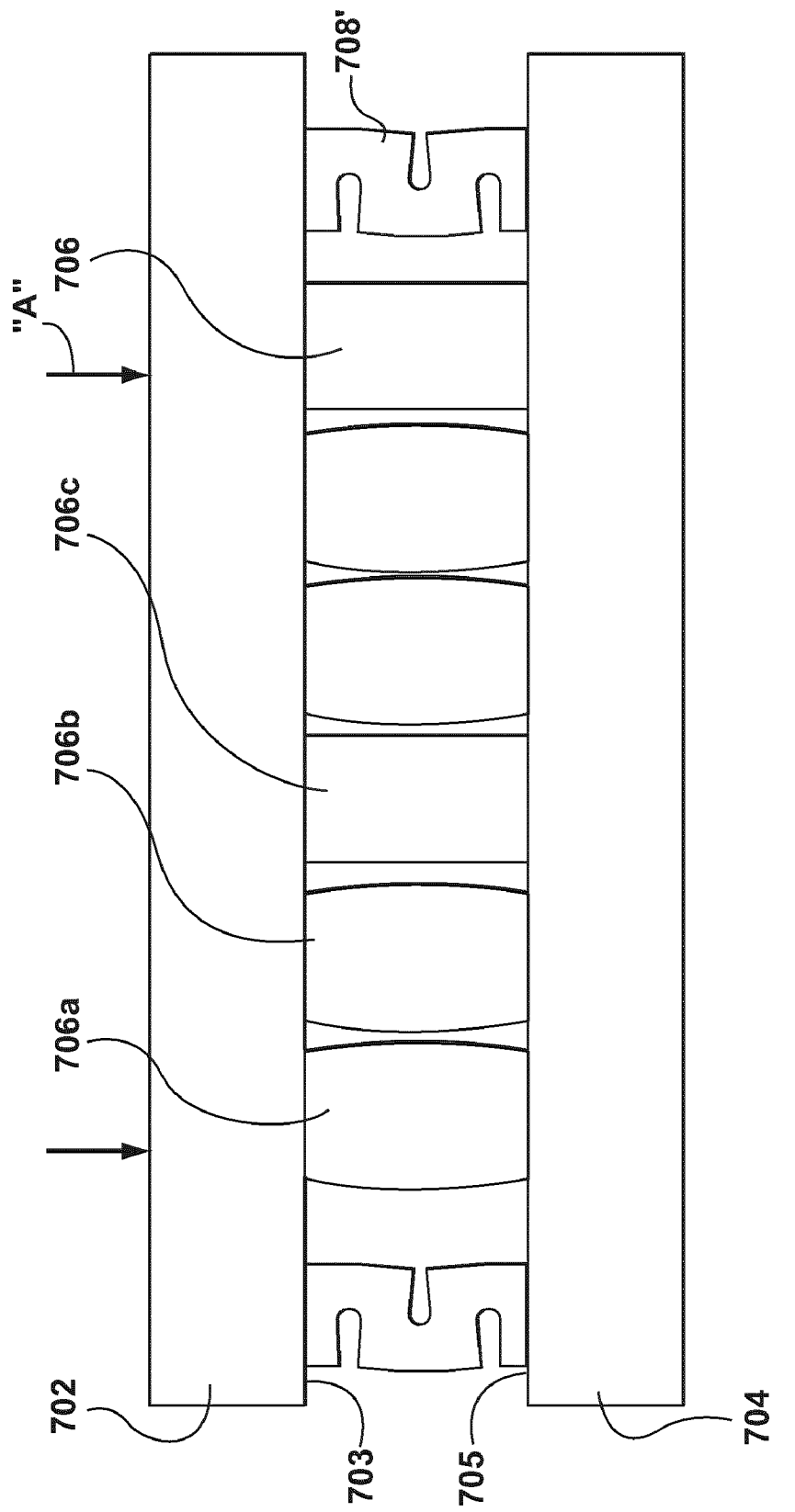

The net result enjoyable by use of the tonnage regulating structure 302 will be demonstrated with reference to FIG. 7A and FIG. 7B. More specifically, FIG. 7A schematically depicts a first mold half 702 and a second mold half 704 and disposed therebetween a plurality of molding stacks 706. The first mold half 702 is associated with a first mold face 703 and the second mold half 704 is associated with a second mold face 705.

It is evident from FIG. 7A that some of the plurality of molding stacks 706 are dimensioned (length-wise) differently from others of the plurality of molding stacks 706, these differences in dimensions being greatly exaggerated, for illustration purposes only, in FIG. 7A. For example, a first molding stack 706a is longer than a second molding stack 706b. By the same token, the second molding stack 706b is longer than a third molding stack 706c.

FIG. 7A further depicts two instances of a tonnage regulating structure 708 disposed between the first mold half 702 and the second mold half 704, the two instances of the tonnage regulating structure 708 being implemented in accordance with the embodiment described above with reference to FIG. 3 and FIG. 4.

FIG. 7B illustrates the net result of the function of the tonnage regulating structure 708 when at least a portion of clamp tonnage "A" is applied (in a manner known in the art, the clamp tonnage "A" can be generated by a suitable hydraulic clamp, electric clamp, toggle clamp or the like). Within the illustration, it can be clearly seen that a tonnage regulating structure 708' is in the "in-use" configuration, whereby the above-described compensating structure 308 has compensated for height differences between some of the plurality of molding stacks 706. The net result is at least mitigation of some deformation of the first molding stack 706a, the second molding stack 706b and the third molding stack 706c and/or more even force distribution therebetween. A technical effect of embodiments of the present invention includes improved useful life span of the mold components (for example, the first molding stack 706a, the second molding stack 706b and the third molding stack 706c due to at least partially to decreased wear on these components).

It should be noted that the embodiment of the compensating structure 308 described above is just one example of an implementation thereof. An alternative embodiment of the implementation is depicted in FIG. 8A and FIG. 8B.

FIG. 8A depicts a tonnage regulating structure 802 implemented in accordance with another non-limiting embodiment of the present invention. FIG. 8A depicts the tonnage regulating structure 802 in a resting configuration and it is associated with a first height 806. FIG. 8B depicts a tonnage regulating structure 802', which is the tonnage regulating structure 802 under clamp tonnage "A". The tonnage regulating structure 802' is associated with a second height 806'. The tonnage regulating structure 802 is associated with a body 804. The body 804 is made of a first material, such as steel and the like. The body 804 is associated with a compensating structure 808, the compensating structure 808 being made of a second material which affords it a degree of resiliency. For example, the second material can be a resilient and/or deformable material, such as hot rubber, suitable plastic material and the like. Accordingly, under clamp tonnage "A" being applied, the compensating structure 808 (FIG. 8A) changes dimension height-wise to a compensating structure 808' (FIG. 8B), the process being reversed when the clamp tonnage "A" ceases to be applied. It is noted that it is this resiliency that allows to change the first height 806 to the second height 806'.

FIG. 9A and FIG. 9B depict yet another embodiment of a compensating structure 908 (and a compensating structure 908' under clamp tonnage "A" being applied). The compensating structure 908 is substantially similar to the compensating structure 808 other than for the placement thereof. In the embodiment of FIG. 9A and FIG. 9B, the compensating structure 908 is positioned in the middle of a body 904. It is worthwhile noting that other placements for the compensating structure 908 are possible. It is also possible to place two or more instances (i.e. at least two instances) of the compensating structure 906 along the body 904.

Figure 10:
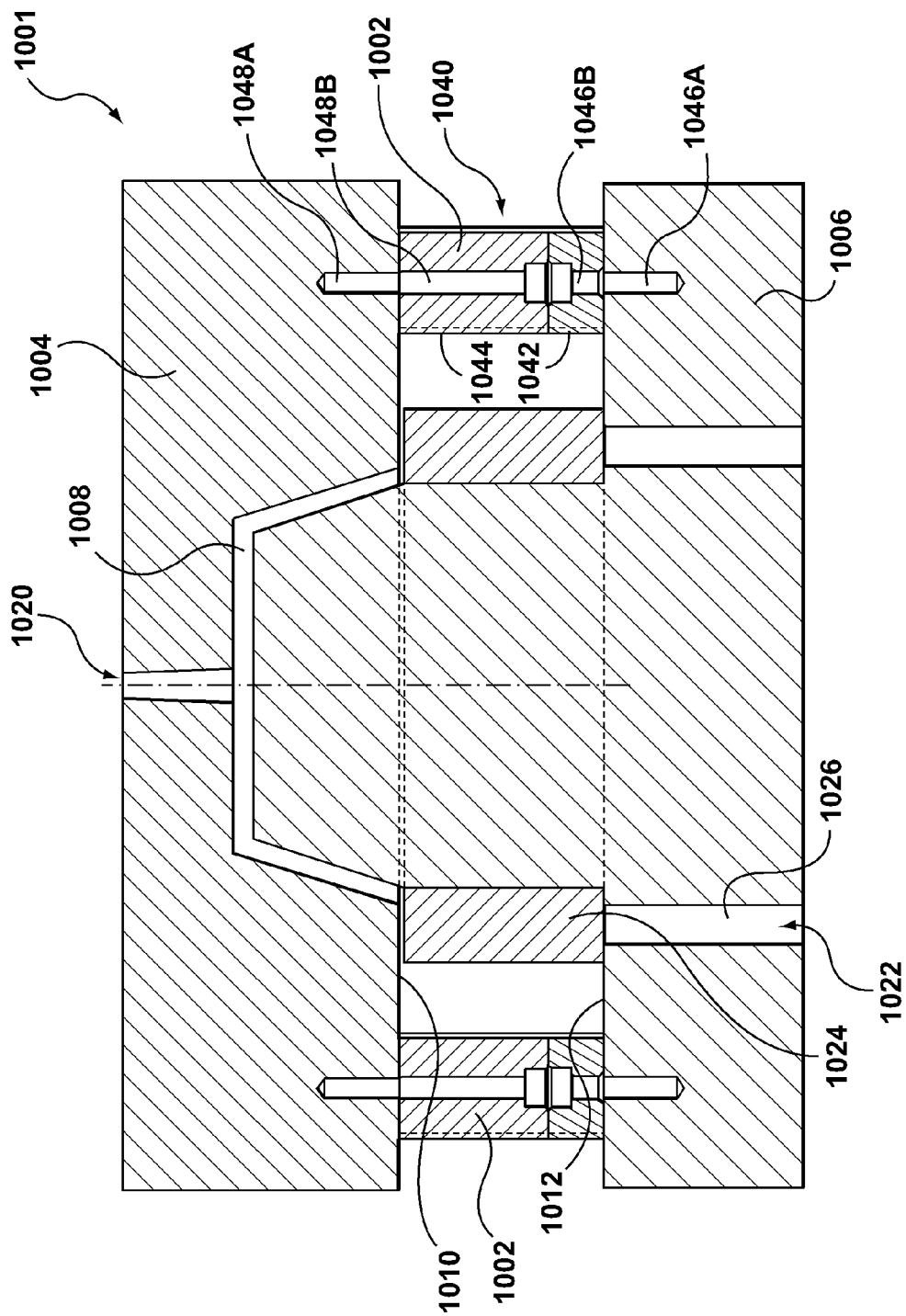
FIG. 10 depicts yet another non-limiting implementation for a compensating structure of the tonnage regulating structure.

In yet further embodiments of the present invention, further implementations for the compensating structure 308 are possible. One such non-limiting embodiment is depicted with reference to FIG. 10. FIG. 10 depicts a cross-sectional view of an example of a mold 1001 for use in a molding machine (not depicted, but well known to those of skill in the art). The mold 1001 comprises a single molding cavity, but this needs not be so in every embodiment of the present invention and, as such, in alternative embodiments a multi-cavity mold may of course be used.

The mold 1001 comprises a cavity portion 1004 and a core portion 1006 defining together therebetween a molding cavity 1008. The cavity portion 1004 comprises a cavity side mold face 1010 and the core portion 1006 comprises a core side mold face 1012. Also provided in FIG. 10 are two instances of a tonnage regulating structure 1002 implemented in accordance with another non-limiting embodiment of the present invention. FIG. 10 depicts a configuration of the mold 1001 where the closing of the cavity portion 1004 and the core portion 1006 has begun, but no clamp tonnage is yet being applied.

FIG. 10 also illustrates a melt inlet 1020 for communicating molding material towards the molding cavity 1008. Also shown in FIG. 10 is a stripper assembly 1022, which includes a stripper plate 1024 and an ejector 1026. Operation of the stripper assembly 1022 is well-known to those of skill in the art and it is generally used to assist in ejecting a molded part (not depicted) off the core portion 1006.

Within these embodiments of the present invention, the tonnage regulating structure 1002 comprises a body 1040. The body 1040 is depicted in its resting configuration, as has been described herein above in respect to other non-limiting embodiments of the present invention. The body 1040 comprises a first portion 1042 and a second portion 1044. The first portion 1042 is coupled to the core portion 1006 by means of a suitable fastener (not depicted) receivable within complementary bores 1046A, 1046B defined, respectively, in the core portion 1006 and the first portion 1042. The second portion 1044 is coupled to the cavity portion 1004 by means of a suitable fastener (not depicted) receivable within complementary bores 1048A, 1048B defined, respectively, in the cavity portion 1004 and the second portion 1044.

Within these embodiments of the present invention, the first portion 1042 can be implemented as a compensating structure. As such, within these embodiments, the second portion 1044 can be made of a first material, such as steel and the like and the first portion 1042 can be made of a second material which affords it a degree of resiliency. For example, the second material can be a resilient and/or deformable material, such as hot rubber, suitable plastic material and the like. Naturally, the construction of the first portion 1042 and the second portion 1044 can be reversed. In other words, it can be said that one of the first portion 1042 and the second portion 1044 can be implemented as the compensating structure.

Resiliency of the second material, within these embodiments of the present invention, allows for the body 1040 of the tonnage regulating structure 1002 to change from the first, resting, height to a second, in-use, height, as has been described herein above with reference to other non-limiting embodiments of the present invention, whereby the second height is smaller than the first height.

Figure 11:
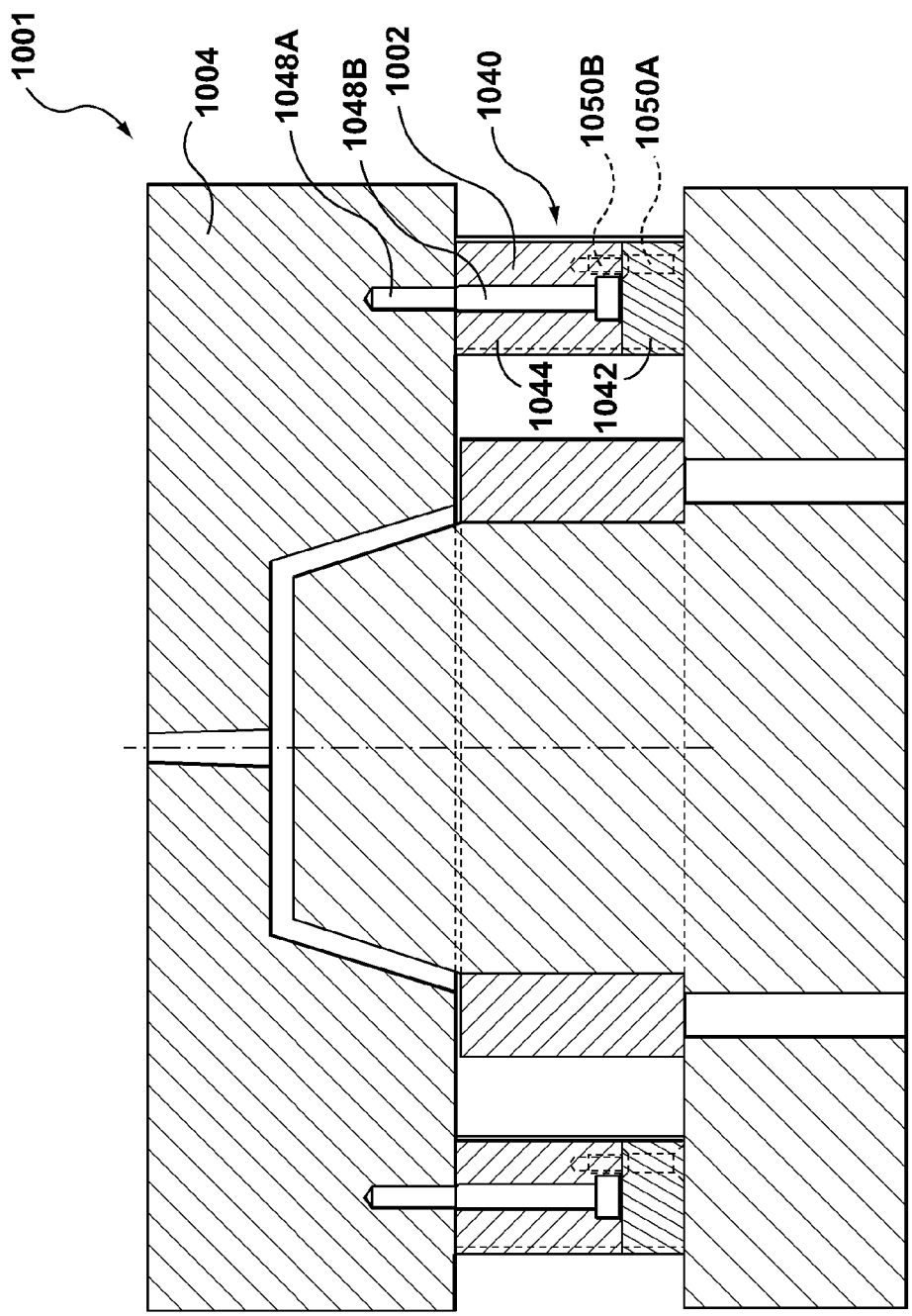
FIG. 11 depicts yet another non-limiting variation of the implementation for the compensating structure of FIG. 10.

With brief reference to FIG. 11, another non-limiting implementation will be described. FIG. 11 depicts a variant of the mold 1001 of FIG. 10, which is implemented in substantially the same manner other than for the specific differences to be described momentarily. As such, specific components of the mold 1001 in FIG. 11, which are implemented in a similar manner to those of FIG. 10, are not separately numbered and reference can be made back to FIG. 10 for the description thereof.

What distinguishes illustration of FIG. 11 from that of FIG. 10 is how the first portion 1042 and the second portion 1044 are coupled. The second portion 1044 is coupled to the cavity portion 1004 by means of a suitable fastener (not depicted) receivable within complementary bores 1048A, 1048B defined in the cavity portion 1004 and the second portion 1044, respectively. The first portion 1042 is coupled to the second portion 1044 by means of a suitable fastener (not depicted) receivable within complementary bores 1050A, 1050B defined, respectively, in the first portion 1042 and the second portion 1044. Within these embodiments of the present invention, the first portion 1042 can implement the compensating structure.

It should be understood that yet further non-limiting implementations for the compensating structure are possible. For example, a resiliently-biased implementation is possible, where the compensating structure 308 is implemented as a resiliently-biased member (such as a spring and the like) urging the compensating structure 308 to the first height 306.

Figure 12:
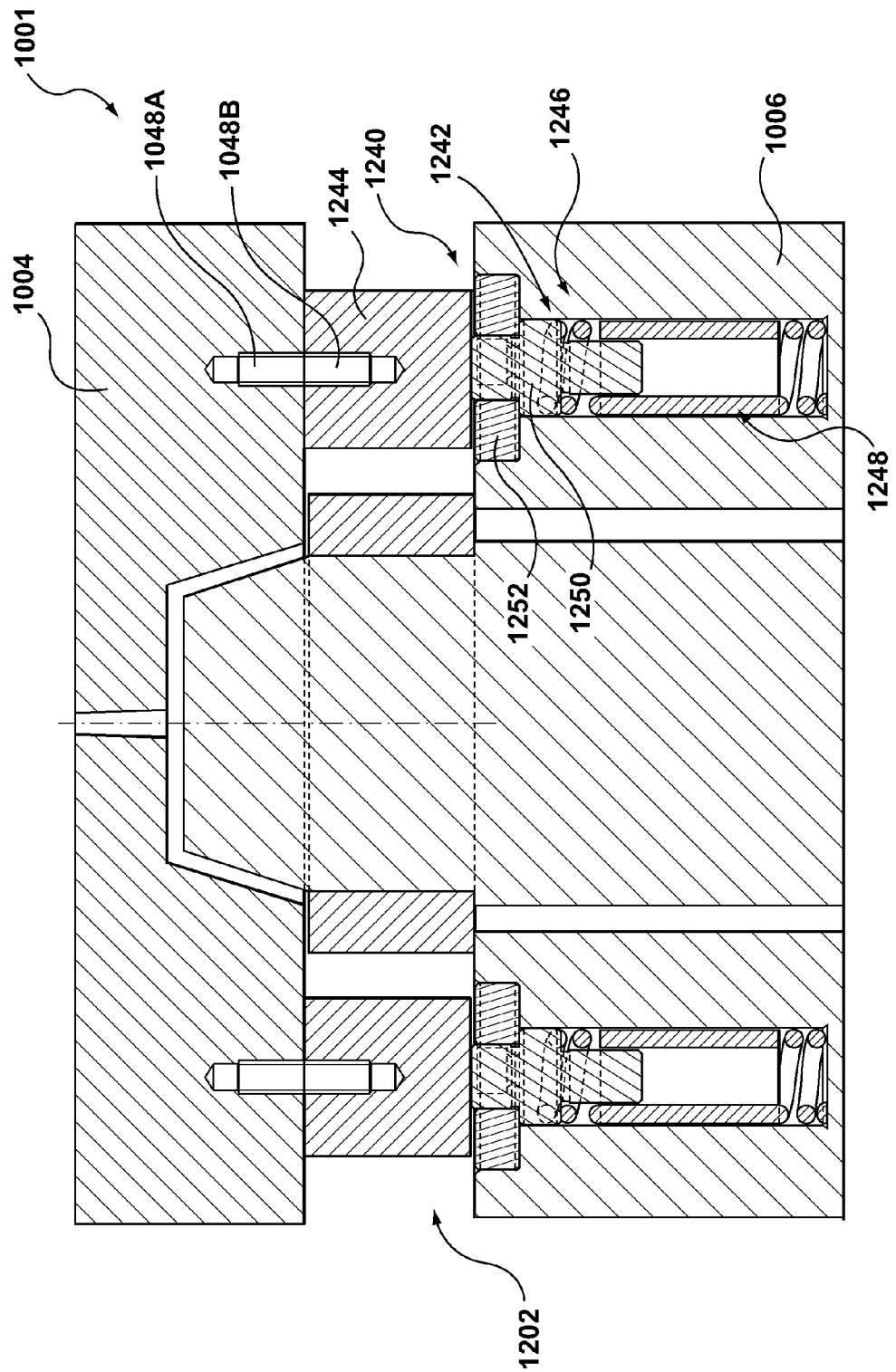
FIG. 12 depicts yet another non-limiting implementation for a compensating structure of the tonnage regulating structure.

An example of such non-limiting implementation will now be described in greater detail with reference to FIG. 12. FIG. 12 depicts another non-limiting embodiment of the mold 1001, which is implemented in a substantially similar manner to what has been described above with reference to FIG. 10, but for the specific differences to be described herein below.

The mold 1001 includes two instances of a tonnage regulating structure 1202 implemented in accordance with another non-limiting embodiment of the present invention. FIG. 12 depicts a configuration of the mold 1001 where the closing of the cavity portion 1004 and the core portion 1006 has begun (but is not finished yet), but no clamp tonnage is yet being applied.

Within these embodiments the present invention, the tonnage regulating structure 1202 comprises a body 1240. The body 1240 is depicted in its resting configuration, as has been described herein above in respect to other non-limiting embodiments of the present invention. The body 1240 comprises a first portion 1242 and a second portion 1244. The second portion 1244 is coupled to the cavity portion 1004 by means of a suitable fastener (not depicted) receivable within complementary bores 1048A, 1048B defined, respectively, in the cavity portion 1004 and the second portion 1244.

Within these embodiments of the present invention, the first portion 1242 can be implemented as a compensating portion. Within these embodiments of the present invention, the first portion 1242 comprises a spring pack 1248 positionable within a pocket 1246 defined in the core portion 1006. The first portion 1242 further comprises a pin 1250 and a retainer 1252. The retainer 1252 comprises an aperture (not separately numbered) and a portion of the pin 1250 is biased upwardly (as viewed in FIG. 12) through the aperture in the retainer 1252, towards the cavity portion 1004, by the spring pack 1248, in a resting configuration. The retainer 1252 cooperates with a shoulder (not separately numbered) of the pin 1250 to retain the pin 1250 (and the spring pack 1248) within the pocket 1246. Naturally, the positioning of the first portion 1242 and the second portion 1244 can be reversed.

Within these embodiments, the spring pack 1248 allows for the pin 1250 to toggle between an extended arrangement (in the resting configuration), as is depicted in FIG. 12, and a compressed arrangement (in the in-use configuration). This, in turn, allows the body 1240 of the tonnage regulating structure 1202 to change from the first, resting, height to a second, in-use, height, as has been described herein above with reference to other non-limiting embodiments of the present invention, whereby the second height is smaller than the first height.

Within the illustration of FIG. 12, as the cavity portion 1004 and the core portion 1006 continue to be urged together and eventually clamped, the spring pack 1248 will compress, the pin 1250 will retract, eventually coming to the second, in use, height. The process is reversed as the mold is unclamped and the cavity portion 1004 and the core portion 1006 are urged apart.

In yet another alternative non-limiting variation of the implementation of the embodiment of FIG. 12, the second portion 1244 of the body 1240 can be omitted. Within that alternative, the body 1240 comprises the first portion 1242 and the pin 1250 is configured to act directly on a mold face (not separately numbered) of the cavity portion 1004.

It is noted that the compensating structure implemented in accordance with various non-limiting embodiments described above allows for a controlled deformation of the compensating structure, as opposed to the uncontrolled deformation experienced in the prior art designs. In other words, by selecting the resting height and degree of resiliency of the compensating structure, it is possible to achieve a controlled deformation to the in-use height, which allows to enjoy the benefit of the tonnage regulating structure (i.e. absorption and/or re-distribution of the clamp tonnage "A"), while at least partially alleviating the need to manufacture the tonnage regulating structure to extremely high tolerances.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/ or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. A tonnage regulating structure for use in a mold of a molding machine to perform the function of absorbing and re-distributing a portion of a clamp force, the mold being associated with an opening clearance between mold faces in a mold closed and clamped configuration, the opening clearance being a distance between a cavity side mold face and a core side mold face, the tonnage regulating structure comprising:
   a body having a first height in a resting configuration, the first height selected to be larger than the opening clearance between the mold faces in a mold closed and clamped configuration;
   the body including a compensating structure, the compensating structure for regulating, in use under applied clamp tonnage, the body to a second height, the second height being smaller than the first height;
   wherein said compensating structure comprises a plurality of cut-out portions defined in the body, the plurality of cut-out portions is spaced along a height of the body such as to provide a degree of resiliency to the body.

2. The tonnage regulating structure of claim 1, wherein said second height substantially corresponds to the opening clearance between the mold faces in a mold closed and clamped configuration.

3. The tonnage regulating structure of claim 1, wherein said regulating is a controlled regulating by selecting the first height and a degree of resiliency of the compensating structure.

4. The tonnage regulating structure of claim 1, further comprising an aperture, defined therethrough, for accepting, in use, a fastener for coupling to one of the mold faces.

5. A mold for use in a molding machine, the mold comprising:
   a cavity portion including a cavity side mold face and a core portion including a core side mold face, the cavity portion and the core portion defining therebetween a molding cavity; the mold being associated with an opening clearance between the cavity side mold face and the core side mold face in a mold closed and clamped configuration, the opening clearance being a distance between the cavity side mold face and the core side mold face;
   a tonnage regulating structure to perform the function of absorbing and re-distributing a portion of a clamp force, the tonnage regulating structure including
      a body having a first height in a resting configuration, the first height selected to be larger than the opening clearance;
      the body including a compensating structure, the compensating structure for regulating, in use under applied clamp tonnage, the body to a second height, the second height being smaller than the first height;
      wherein said compensating structure comprises a plurality of cut-out portions defined in the body, the plurality of cut-out portions is spaced along a height of the body such as to provide a degree of resiliency to the body.

* * * * *